INVENTOR.
ROBERT F. LOGSDON

June 30, 1953  R. F. LOGSDON  2,643,735
CORRUGATED SCREEN GAS IMPINGEMENT FILTER
Filed June 26, 1951  6 Sheets-Sheet 2

INVENTOR.
ROBERT F. LOGSDON

June 30, 1953  R. F. LOGSDON  2,643,735
CORRUGATED SCREEN GAS IMPINGEMENT FILTER
Filed June 26, 1951  6 Sheets-Sheet 3

INVENTOR.
ROBERT F. LOGSDON
BY Arthur H Robert
atty

June 30, 1953　　　　R. F. LOGSDON　　　　2,643,735
CORRUGATED SCREEN GAS IMPINGEMENT FILTER
Filed June 26, 1951　　　　　　　　　　　　6 Sheets-Sheet 4

INVENTOR.
ROBERT F. LOGSDON
BY

June 30, 1953  R. F. LOGSDON  2,643,735
CORRUGATED SCREEN GAS IMPINGEMENT FILTER
Filed June 26, 1951  6 Sheets-Sheet 5

INVENTOR.
ROBERT F. LOGSDON
BY

June 30, 1953   R. F. LOGSDON   2,643,735
CORRUGATED SCREEN GAS IMPINGEMENT FILTER
Filed June 26, 1951   6 Sheets-Sheet 6
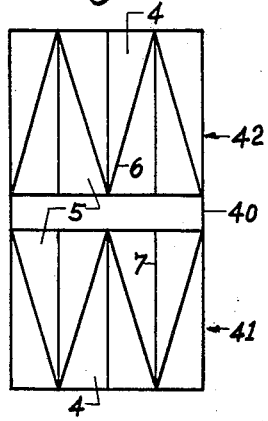
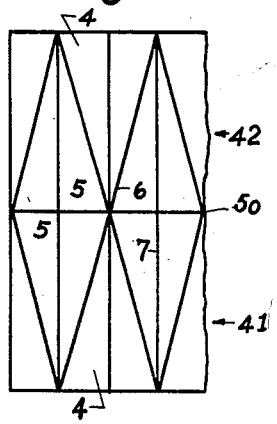
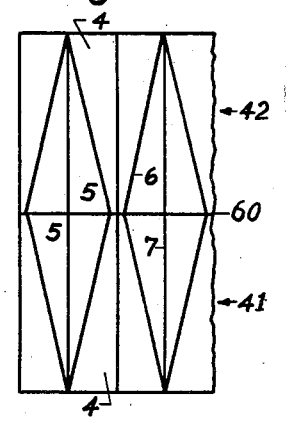
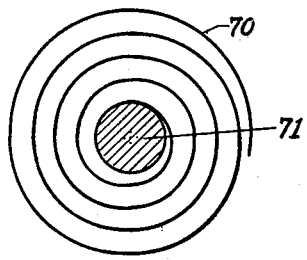
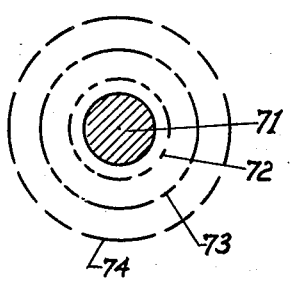
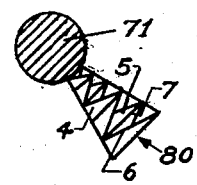
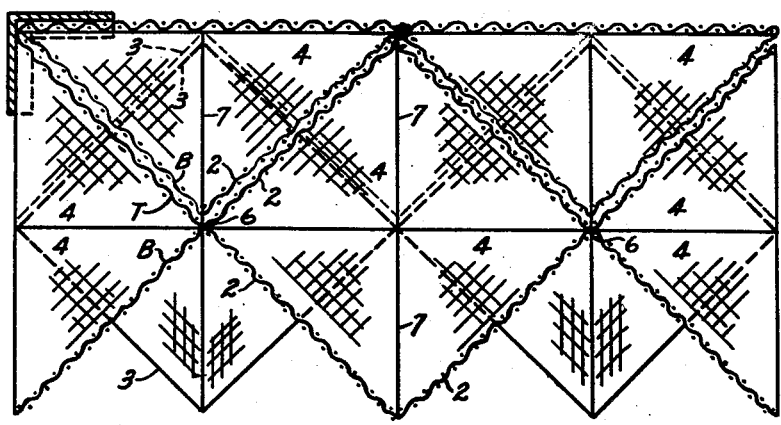
INVENTOR.
Robert F. Logsdon
BY
Arthur Robert
ATTORNEY Patented June 30, 1953

2,643,735

UNITED STATES PATENT OFFICE 2,643,735

CORRUGATED SCREEN GAS IMPINGEMENT FILTER

Robert F. Logsdon, Louisville, Ky., assignor to American Air Filter Company, Inc., Louisville, Ky., a corporation of Delaware Application June 26, 1951, Serial No. 233,665

27 Claims. (Cl. 183—69)

This invention relates to improvements in corrugated wire mesh screen gas impingement filters of the class wherein the screens and their corrugations both extend in the general direction of the air flow.

This class of filter is exemplified by a non-clogging type comprising alternate flat and corrugated screens assembled in close face-to-face relationship so that the corrugations form a multiplicity of relatively large and unobstructed open passageways which not only extend through the filter from one air flow face to the other so as to present correspondingly large openings on each air flow face but also are interconnected through the mesh openings of the screens.

Filters of this non-clogging type have desirable operating characteristics such as: a low initial or clean resistance to the air flow which permits the use of relatively high operating air velocities on the order of 500 lineal feet per minute; a relatively low rate of resistance rise as the dust load accumulates; and a dust-collecting efficiency which is as good as if not better than that of the conventional impingement filter of lower operating velocity.

The principal object of this invention is to provide, in this class of filter, a novel clogging type having the desirable operating characteristics of the non-clogging type coupled with the operating characteristic of clogging rapidly only near or at the end of its normal or intended period of operation.

Another important object is to improve this class of filter to the ends of substantially increasing the dust and oil-holding capacities and of securing a much better distribution of the dust load.

A still further object is to provide a unique trough screen which can be used to advantage not only in making a clogging type of filter but also a non-clogging type.

The invention is illustrated in the accompanying drawings wherein.

Figure 5:
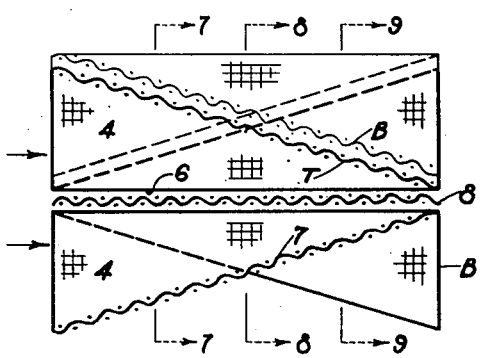
Figure 5 is a vertical sectional view taken through a filter element, composed of two trough screens with an interposed flat screen such as is illustrated by the lower element of Figure 4, with the bottom trough screen of an adjacent superposed filter element assembled upon its upper face, this view corresponding to one taken along line 5—5 of Figure 3.
Figure 6:
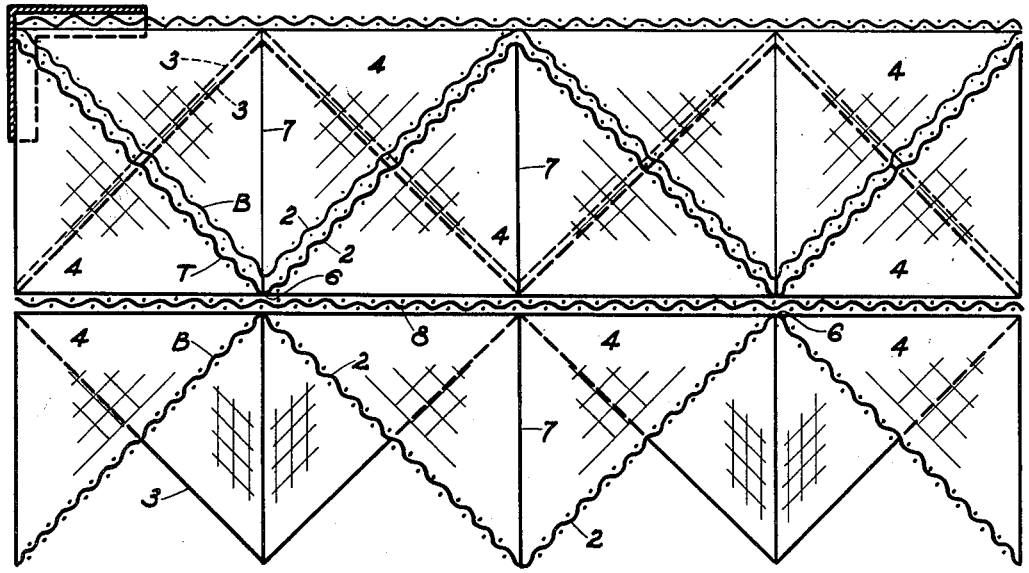
Figure 6 is a front elevational view of the assembly shown in Figure 5, this view representing fragmentary portion of a filter unit.
Figure 7:
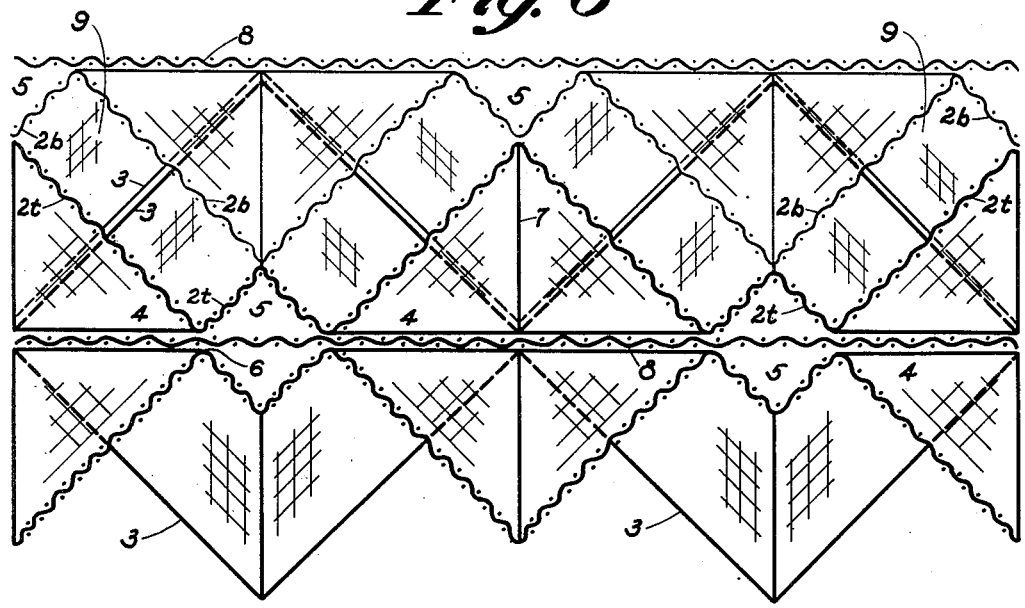
Figure 8:
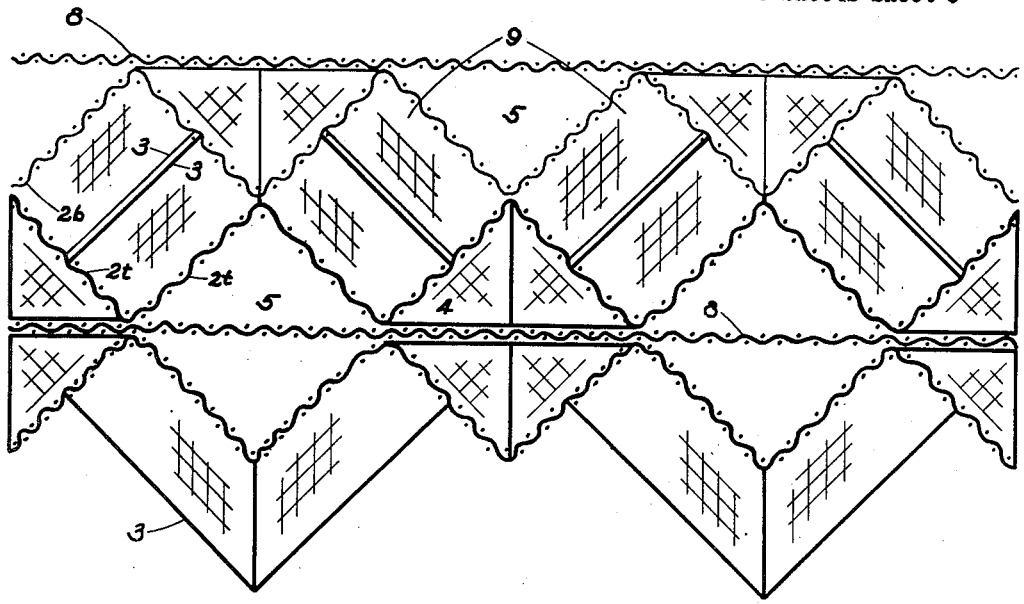
Figure 9:
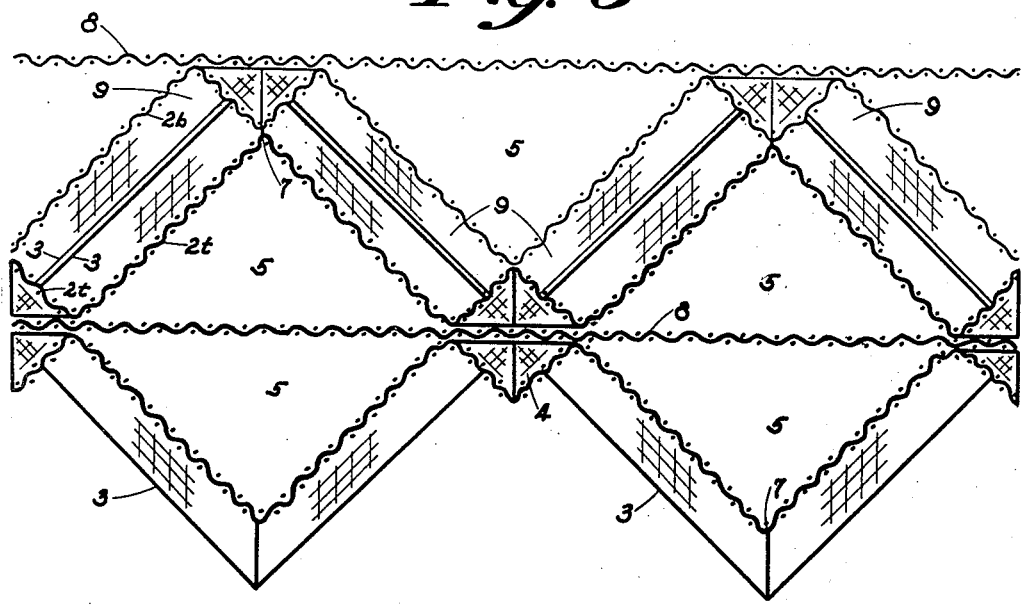
Figure 10:
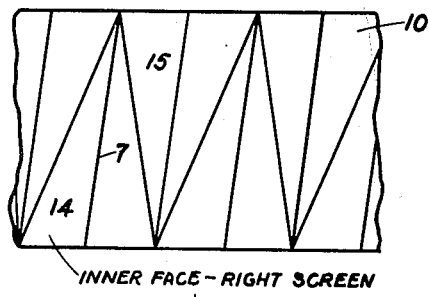
Figure 11:
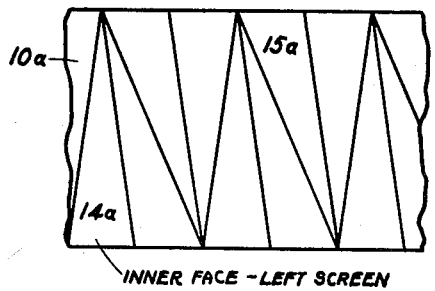
Figure 12:
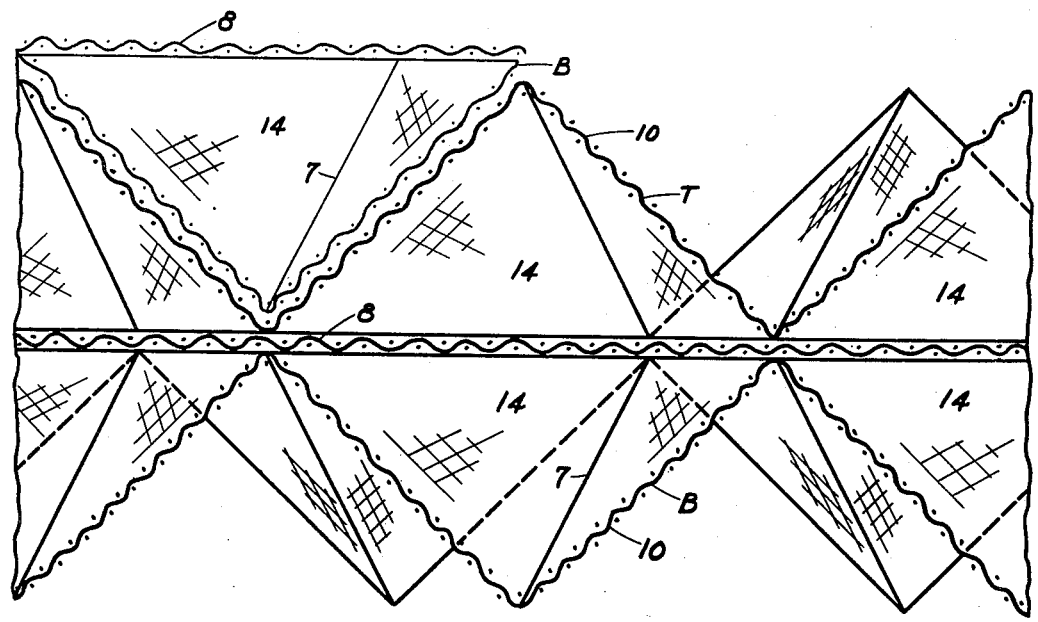
Figure 13:
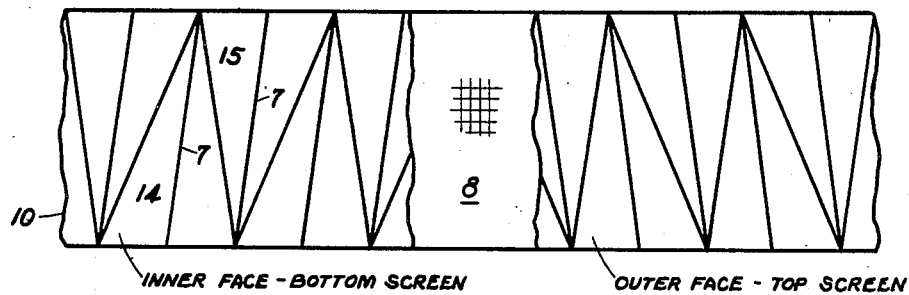
Figure 14:
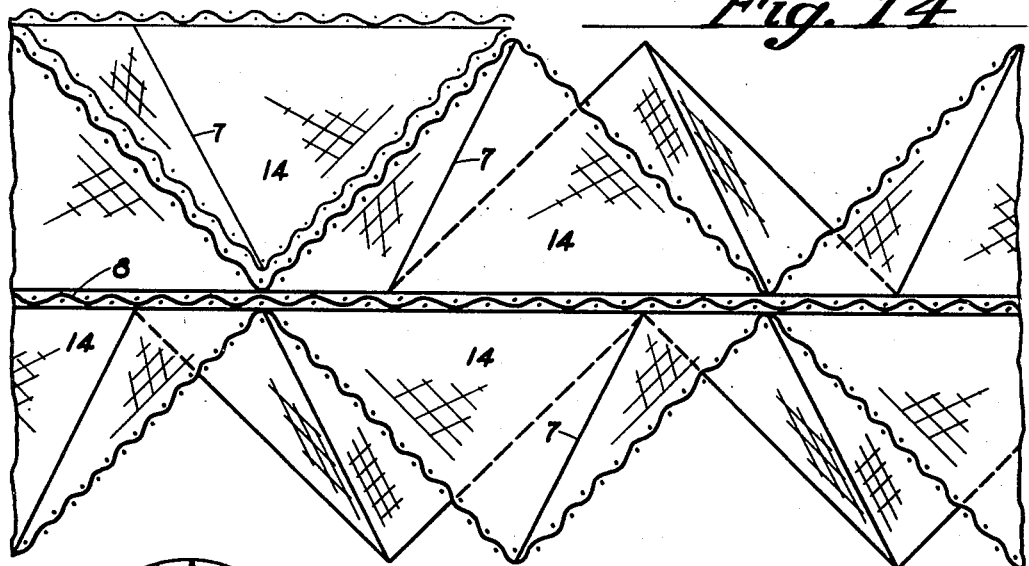
Figure 21:
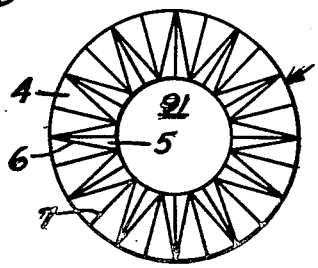

Figures 7, 8 and 9 are vertical sectional views taken along lines 7—7, 8—8 and 9—9 of Figure 5;

Figures 10 and 11 are diagrammatic top plan views of fragmentary portions of the inner faces of "right" and "left" diagonal trough screens respectively, these screens being respectively designated right and left because, when their inner faces are viewed in top plan, the troughs angle toward the right on the right screens and toward the left on the left screens;

Figure 12 is a front elevational view, similar to Figure 6, with each filter element composed of a right diagonal trough screen on the bottom, a left diagonal trough screen on the top and an interposed flat screen;

Figure 13 is a partly broken top plan view diagrammatically showing the direction in which the troughs extend in a filter element composed of a pair of right (or left) diagonal trough screens with an interposed flat screen;

Figure 14 is a front elevational view, similar to Figure 12 of a filter unit composed of an assembly of filter elements of the character shown in Figure 13 with an interposed flat screen;

Figures 15, 16 and 17 are diagrammatic top plan views of fragmentary portions of the inner faces of three different trough screens, each having at least two successions of troughs;

Figures 18, 19 and 20 are diagrammatic views indicating how the screens of three different species of axial flow cartridge filters may be arranged to form cartridge filter units;

Figure 21 is a diagrammatic top plan view of a filter screen of the ring type; and Figure 22 is a front elevational view corresponding to Figure 6 but omitting the interposed flat screens.

Figure 1:
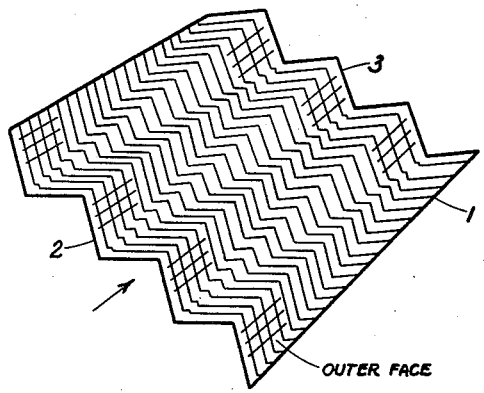
Figure 1 is a perspective view of the outer face of a trough screen made in accordance with my invention.
Figure 2:
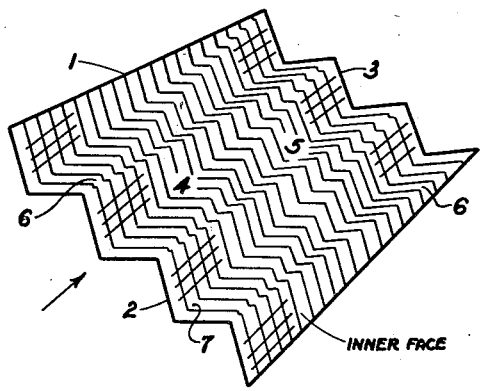
Figure 2 is a perspective view of the inner face thereof.
Figure 3:
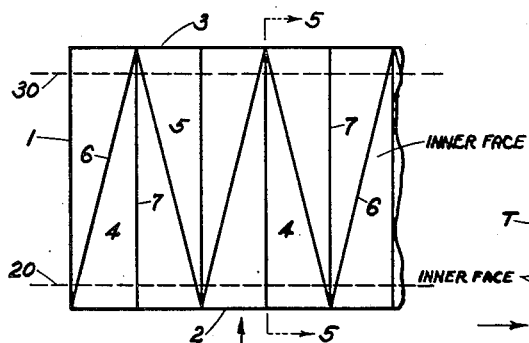
Figure 3 is a diagrammatic plan view of a fragmentary portion of the inner face.

Trough screen—Figures 1–3

The preferred embodiment of a trough screen 1, which is shown in these figures, has inner and outer faces, opposite side edges and front and rear gas flow edges 2 and 3. Each screen is so corrugated as to provide, on its inner face, an alternate series of troughs 4 and an intermediate series of troughs 5. These troughs collectively proceed in succession from one side edge to the other and present, on the inner face, corresponding straight longitudinal edges or crests 6, all lying in a common plane which is designated as the common inner face plane. The longitudinal edges 6 individually extend from one gas flow edge 2 to the other gas flow edge 3. Collectively they preferably proceed in zig-zag fashion across the inner face from one side edge to the other.

Each of the troughs 4 and 5 are open at one end and pointed at their opposite ends where their respective longitudinal edges 6 meet. Each trough progressively increases in width and depth or area from its pointed end to its open end. The alternate troughs 4 are arranged with their open ends positioned along the front gas flow edge 2 and with their pointed ends positioned along the rear gas flow edge 2 and lying in said common inner face plane; hence these troughs may be said to point in one direction away from the front gas flow edge. The intermediate troughs 5 are reversely arranged to point in the opposite direction with their pointed ends lying in said common inner face plane. The bight 7 of each trough slopes from its pointed end to its open end where it terminates in a common plane adjacent the outer face of the screen, this plane being designated as the common outer face plane.

Figure 4:
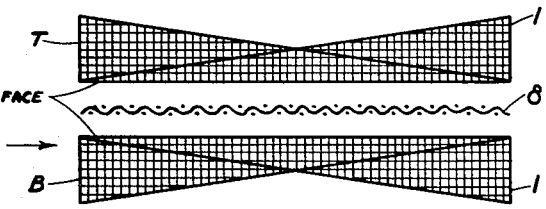
Figure 4 is a side elevational view of a pair of lower trough screens assembled, with an interposed flat screen to form a filter element together with an upper pair of similar character in position to be assembled upon each other and upon the assembled filter element.

Clogging type filter element—Figure 4

Broadly speaking, a preferred embodiment of a clogging type of filter element made, in accordance with the present invention, comprises: a trough screen of the character described; and another (trough or other) screen assembled against the inner face of the trough screen to close the open side of the troughs with mesh so that the open mesh walls of both screens cooperate to form, between them, an alternate series of funnel-shaped pyramidical gas flow pockets which are open at the front gas flow edge 2 and closed by mesh or pointed at the rear gas flow edge 3, and an intermediate series of funnel-shaped pyramidical pockets which are closed by mesh or pointed at the front gas flow edge and open at the rear gas flow edge, these pointed mesh pockets being interconnected through the mesh openings of the walls forming them. The other screen may be either a flat screen or a trough screen.

Where a clogging type of filter element is formed by assembling the inner face of a trough screen over one face of a flat screen, such filter element is duplicated by similarly assembling another trough screen over the other face of the flat screen. Figure 4 illustrates a duplicate filter element of this character involving a pair of the trough screens 1 shown in Figures 1-3 assembled with their inner faces in opposed relationship. Their respective inner faces are also pressed against the opposite faces of a flat screen 8 which is interposed between them. The filter elements shown here are horizontally arranged and, for convenience, the bottom and top trough screens are respectively designated B and T. Since this particular arrangement utilizes an interposed flat screen, the corresponding troughs and longitudinal edges 6 of the top and bottom trough screens T and B need not be in opposed relationship, but, of course, such relationship may be employed.

Where the filter element comprises a pair of trough screens without an interposed flat screen, the corresponding troughs of both screens must be in opposed relationship and the corresponding longitudinal edges 6 of both screens should be in contact with each other in order to form the pointed mesh pockets which characterize the preferred embodiment of a clogging type of filter element.

Clogging type of filter unit—Figures 5-9

The impingement filter unit, shown in these figures, comprises two or more filter elements, of the clogging type shown in Figure 4, assembled one upon the other. For the sake of clarity, these figures illustrate only one duplicate filter element and one single filter element with the bottom trough screen B of the single filter element assembled upon the top screen T of the duplicate filter element. These two filter elements are assembled with their adjacent faces in face-to-face relationship and with the front and rear marginal portions of their adjacent faces contacting each other in nesting relationship.

In this latter connection, it will be noted: that the front and rear edges 2 and 3 of all trough screens are identically corrugated; and that, when two filter elements are assembled one upon the other, the front edges 2 of their adjacent top and bottom trough screens T and B will contact each other in nesting relationship throughout their extent. The same contacting and nesting relationship obtains along and throughout their corresponding rear edges 3. While adjacent filter elements have contacting nesting relationship along their front and rear edges, they do not have such relationship between their front and rear edges except along those portions corresponding to the sloping bights 7. The sloping sides of each corrugation in one screen of one filter element are spaced from the sloping sides of the adjacent corrugations in the adjacent screen of the adjacent filter element. This can be appreciated by examining the front elevational view of the filter unit as shown in Figure 6 and the vertical transverse sections taken through the unit at different planes along its depth as shown in Figures 7, 8 and 9.

In Figure 6, the corrugated front edge of trough screen T has nesting contact with the corrugated front edge 2 of the upper screen B. The same is true of the rear gas flow edges 3 of these screens which are shown in dotted lines. As a consequence, the incoming air must enter the opening of the pockets formed by the alternate troughs 4. It cannot enter the filter unit by passing between the filter elements because each duplicate filter element has nesting contacts along the front face of the unit with each adjacent duplicate or single filter element.

In Figure 7, the cut edge of a top screen T (corresponding to front edge 2) is indicated by numeral 2t while the corresponding cut edge of the bottom screen B, of the next higher filter element, is indicated by numeral 2b. It will be noted that the edges 2b and 2t cooperate to form the sides of a series of openings 9 between screens T and B and, through the center of each of these openings, the rear contacting gas flow edges 3 of screens T and B can be seen. Each of these openings, in Figure 7, is long in one direction and narrow in the other.

In Figure 8, each opening 9 formed by the cut edges 2b and 2t has decreased in its long dimension and increased in its narrow dimension so as to be more or less equal in length on all sides.

The increase in the narrow dimension shows a larger portion of the rear gas flow edges 3 of screens B and T.

In Figure 9, each opening formed by the cut edges 2t and 2b has again decreased in the original long dimension and increased in the original narrow dimension so that a still larger portion of the rear gas flow edges 3 of screens B and T can be seen.

It should now be appreciated that each opening 9 in Figures 7, 8 and 9 represents a space between adjacent filter elements. This space extends from the front air flow face to the rear air flow face. At the front air flow face, the space 9 between filter elements is closed by the front edges 2 which are in nesting contact. At the rear air flow face it is closed by the corresponding rear edges 3. Between front and rear air flow faces, the space 9 is rectangular in cross-section with two of its sides formed by a continuous wall 2t and its other two sides formed by a continuous wall 2b. Since these walls touch each other from one air flow face to the other along lines corresponding to the bights 7, the space 9 is completely enclosed by the mesh walls of the adjacent screens B and T. As a result of the multiplicity of the spaces 9, an assembled filter unit of this character has oil and dust-holding capacities which are unusually high for filters of this class.

*Operation of filter unit—Figures 5-9*

In operation, either the front face or the rear face may be used as the air inlet face. For purposes of explaining operation, the unit is assumed to be placed with its front face upstream so that it acts as an inlet face. With such assumption, the air enters the open ends of the pockets formed by the alternate troughs 4, these pockets being also called the alternate pockets 4. Some of this air will immediately pass through the mesh wall 2t or 2b of the pocket adjacent the front edge to enter space 9. Before the air, thus entering space 9, can leave the filter unit, it must pass through another section of the walls 2b or 2t into an intermediate pocket 5 and flow along that pocket to its open downstream end. It will thus be evident that the air entering an alternate pocket must pass through the mesh openings of two screens to enter an intermediate pocket of either the same element or an adjacent element, a feature which promotes efficient cleaning.

The bulk of the dust initially separated by the filter unit will be deposited in spaces 9 of the upstream half of the filter unit and in the mesh walls forming such spaces. As these mesh openings become clogged with dust, the air remains free to pass more deeply into the pockets before entering spaces 9. Consequently, there is a progressive deposit of dust through the filter and this progressive deposit continues until the mesh openings are clogged from one end of the filter to the other. From this it will be seen that this particular filter has the very desirable characteristic of collecting dust throughout its entire filtering depth so that the dust load is not concentrated in the upstream half of the filter but is well distributed over the upstream and downstream halves. With this better or greater distribution of the collected dust, the filter unit is capable of collecting its increased dust load with a minimum rise in air flow resistance until substantially all of the mesh openings throughout the filter are clogged.

When the mesh openings adjacent the downstream or air outlet face begin to clog, the filter has achieved its normal dust-holding capacity. At this point it should be removed from the air flow, cleaned and recoated with oil or other dust-holding liquid. If this is not done, the filter will continue efficiently to separate dust from air until it is entirely clogged, but during this phase of its operation, its resistance begins to rise more rapidly.

I have obtained excellent results with this design using 12 to 16 mesh screen extending over a filter depth of 1¾ inch and having, at the large end of each trough, openings which are $\frac{3}{16}$ inch in depth and $\frac{3}{8}$ inch in width from one longitudinal edge 6 to the other. The initial resistance of a representative specimen of this particular design approximates $\frac{1}{10}$ inch water gauge with air velocity approximating 500 lineal feet per minute. The rise in resistance, as the dust load increases, is relatively gradual up to its rated capacity, which appears to be higher than the rated capacity of any conventional high-velocity filters. Thereafter, if the filter continues to be operated, its rate of resistance rise increases because the filter continues to collect dust efficiently until it is completely clogged. Normally, when the rated capacity of a filter of this class is reached the efficiency thereafter falls off very rapidly.

*Clogging type of filter unit—Figures 10-12*

In the previously described filter unit of Figures 5-9, the alternate and intermediate pockets all extend more or less parallel to the air flow. The unit of Figures 10-12 is identical to that of Figures 5-9 except the pockets extend diagonally to the air flow.

To form diagonal pockets, right and left screens are employed. In the right trough screen 10 the troughs 14 and 15 angle toward the right relatively to the air flow when the inner face of the screen is viewed in top plan. In the left screen 10a the alternate and intermediate troughs 14a and 15a angle to the left, relatively to the air flow when their inner faces are viewed in top plan. When inverted and viewed in bottom plan, the troughs of the left screens will angle to the right.

In assembling a filter element, either the inner face of a left screen is placed over and in opposed relation to the inner face of a right screen with flat screen 8 interposed between them or the positions of the screens are reversed. When thus assembled, they will form alternate and intermediate pockets, all of which angle to the left when the left screen is used as the bottom screen of the filter element or to the right when the right screen is the bottom screen of the element. The bights 7 of all pockets angle in the same direction as the pockets.

The interposed flat screen 8 may be omitted, but, if it is, the longitudinal edges 6 of the bottom screen should be aligned and placed in contact with the corresponding longitudinal edges 6 of the top screen in order to form the pointed mesh pockets.

This filter, with the diagonal pockets, operates in the same manner as the straight pocket filter shown in Figures 5-9 and the performance characteristics of both filters are substantially the same.

*Clogging type of filter unit—Figures 13-14*

Each filter element of this unit is entirely composed of either left screens or right screens;

hence to illustrate it only right screens are employed. The duplicate or double filter element therefore comprises a top right screen and a bottom right screen assembled with their inner faces in contact with an interposed flat screen 8. With this arrangement, alternate and intermediate diagonal pockets 14 and 15 extending to the left are formed on the top side of the flat screen and alternate and intermediate diagonal pockets 14 and 15 extending to the right are formed on the bottom side of the same flat screen. The construction of this unit otherwise is the same as that of all other units and its operation is the same except that it now becomes possible for air to enter an alternate pocket, in say a lower screen and then to pass through the flat screen 8 to enter an intermediate pocket in the upper screen. Such air passes only through one mesh wall, but in doing so it must take two more or less 90° turns which insures efficient cleaning.

Non-clogging types of filter unit

The flat screen 8 of the filter unit shown in Figures 13–14 may be omitted to form a non-clogging type of unit. This unit has alternate and intermediate pointed troughs as the others do, but it does not have the pointed end pockets, which characterizes the clogging type. Consequently, air can enter the trough of say a lower screen and turn at an angle upwardly into the intermediate trough of the upper screen where it again may turn at another angle to pass along that trough to the air outlet face of the unit. Again, however, the air which does not pass through a screen mesh wall is nevertheless subjected to two abrupt turns which insures efficient cleaning.

Filter units of the non-clogging type may be readily made, following the pattern shown in the arrangements of Figures 5–9, 10–12 and 13–14, by fabricating trough screens so that the troughs have a relatively small but open end in place of the pointed end shown in Figures 1–3. For example, if the front and rear marginal portions, of the trough screens shown in Figures 1–3, are cut off along the dotted lines 29 and 30 indicated on Figure 3, the alternate and intermediate troughs on the inner face of each screen will then cooperate with an adjacent screen to form alternate and intermediate pockets which present a large opening at one end and a relatively small opening at the opposite end. The longitudinal edges 6 will proceed in zig-zag fashion but will not join at their converging ends. The bights will slope but not reach the plane of the longitudinal edges 6. The edges 2b and 2t of Figures 7–9 show the contour of such screens at opposite air flow faces. Since such construction should be obvious, illustration is deemed unnecessary.

Other types

Figure 22 illustrates a clogging type of filter unit utilizing Figures 1–3 trough screens having front and rear gas flow edges 2 and 3, alternate troughs 4, intermediate troughs, longitudinal edges 6 and sloping bights 7. The filter unit of Figure 22 and its filter elements correspond to the filter unit and filter elements shown in Figures 4–9 except for the omission, from each filter element of Figure 22, of the interposed flat screen 8 employed in each filter element of Figures 4–9.

Each of the trough screens described up to this point has had one succession of troughs, comprising one set of alternate troughs and another set of intermediate troughs, extending across the screen. In each of these arrangements, the longitudinal edges along the common inner face plane have been straight. Straight longitudinal edges, however, are not necessary since such edges may be bent sharply or curved gradually.

It will be appreciated that two or more similar trough successions may be employed on each screen and arranged in series in the direction of gas flow so that one succession is located upstream relatively to the next succession. Thus, in Figures 15, 16 and 17, screens 40, 50 and 60 respectively are illustrated, each with two successions of troughs 41 and 42 respectively. The narrow ends of the alternate troughs 4 and the wide ends of the intermediate troughs 5, of both successions 41 and 42, are: spaced from each other in screen 40 of Figure 15; in contact with each other in screen 50 of Figure 16; and merged with each other in screen 60 of Figure 17. These screens obviously can be arranged, as before, to form filter elements and filter units of the cell character described in connection with Figures 1–14; hence further illustration is deemed unnecessary.

Each of the filter elements and units described in connection with Figures 1–17 has been of the cell type having side edges as well as front and rear gas flow edges. Again, it will be appreciated that trough screens, with or without flat screens, may be employed to fabricate filter elements and filter units of the cartridge type. For example, as schematically indicated in Figure 18, a filter element may be wound along a spiral path 70 about an axis 71 to provide a cartridge type of filter unit accommodating a gas flow parallel to the axis. Also, as schematically illustrated in Figure 19, a series of cylindrical filter elements may be arranged around axis 71, with their respective center lines 72, 73, 74, etc. concentric to axis 71, to provide a cartridge type of filter unit accommodating gas flow parallel to axis 71. Again, as is schematically illustrated in Figure 20, each, of a radial series of screens 80, may extend radially from the center of axis 71 with successive troughs in each screen being of progressively larger amplitude or depth proceeding in the radial outward direction. Since all of these axial flow arrangements obviously may be employed, their structural details are not further illustrated.

In Figure 21, a ring type of trough screen 90, having a central opening 91 and radially or outwardly extending troughs, is disclosed. The troughs may be formed in a relatively flat ring-type screen, so that they will extend radially outward from the center of the opening. On the other hand, the troughs may be formed in a conical ring-type screen so that they extend outwardly from the axis of the opening at an inclined angle to that axis. A series of these flat or conical ring-type trough screens, with or without similarly shaped ring-type screens without troughs, may be stacked one upon the other to form a cartridge type unit accommodating a gas flow passing inwardly toward or outwardly from the central opening. Here again, further illustration is not deemed necessary.

This application is a continuation-in-part of my co-pending application Serial No. 175,051, filed July 21, 1950, and now abandoned, the subject matter of Figures 1–14 being common to both applications and the subject matter of Figures 15–21 being new to this application.

Having described my invention, I claim:

1. A trough filter screen for a high-velocity impingement gas filter comprising: an open mesh screen, having inner and outer faces and opposite front and rear gas flow edges; said screen being formed with a succession of troughs which individually extend longitudinally in the general direction of the gas flow and which collectively present, on the inner face, a series of longitudinal edges; each trough having its open longitudinal side between its longitudinal edges and along said inner face; said longitudinal edges individually extending longitudinally in the general direction of the gas flow and collectively proceeding transversely across said inner face in relative zig-zag fashion so that each trough is narrow at its converging end and wide at its opposite end while the longitudinal edges of the alternate troughs converge in a direction toward one gas flow edge and those of the intermediate troughs converge in a direction toward the other gas flow edge; each trough increasing in width and depth in a direction proceeding from its narrow converging end toward its wide end where it presents a relatively large gas flow area with the bight of each trough correspondingly sloping between the wide and narrow ends.

2. A filter element for a high-velocity impingement gas filter comprising: a first trough screen as defined in claim 1; and another screen arranged with one of its faces in contact with the inner face of said first trough screen; said screens cooperating with each other to form a system of gas flow spaces defined by mesh walls.

3. The filter element of claim 2 wherein: said screens cooperate to form a series of gas flow openings along at least one gas flow edge.

4. The filter element of claim 2 wherein: said other screen is a second trough screen arranged with its inner face in contact with the inner face of said first screen.

5. The filter element of claim 2 wherein: said other screen is a flat screen.

6. The filter element of claim 5 wherein: a second trough screen is arranged with its inner face in contact with the other face of said flat screen.

7. A high-velocity impingement gas filter comprising: at least two filter elements, each as defined in claim 2, arranged in adjacent face-to-face relationship with at least one of the gas flow margins of the outer trough screen face of one filter element in close nesting relationship with the corresponding margin of the adjacent outer trough screen face of the other filter element.

8. A high-velocity impingement gas filter comprising: at least two filter elements, each as defined in claim 2, arranged in adjacent face-to-face relationship with the alternate trough bights, on the outer trough screen face of each element, in contact with the corresponding intermediate trough bights on the adjacent outer trough screen face of the other element.

9. A trough filter screen for a high-velocity impingement gas filter comprising: an open mesh screen, having inner and outer faces and opposite front and rear gas flow edges; said screen being formed with longitudinal troughs which are open along one longitudinal side, which proceed in succession across the inner face in a direction substantially parallel to the gas flow edge and which present, on the inner face, a series of longitudinal edges, all lying in a common plane; said longitudinal edges individually extending in the general direction of the gas flow and collectively proceeding in zig-zag fashion across the inner face; each trough having its open side along said common plane and being pointed at the end where its longitudinal edges meet, and progressively increasing in width and depth from its pointed end to its opposite end; the alternate troughs being arranged to point in one direction away from one gas flow edge with their pointed ends positioned adjacent said common inner face plane and with their bights sloping from their pointed ends to their opposite ends where they terminate in a common plane adjacent the outer face of the screen; and the intermediate troughs being similarly arranged to point in the opposite direction.

10. A filter element for a high-velocity impingement gas filter comprising: a pair of trough screens, each as defined in claim 9, arranged with their inner faces in adjacent opposed relationship to form therebetween a system of gas flow spaces defined by mesh walls and with their corresponding longitudinal trough edges and troughs in opposed relationship along the front and rear gas flow edges of the filter element to form one series of gas flow openings along the front edge and another series of gas flow openings along the rear edge.

11. A high-velocity impingement gas filter comprising: at least two filter elements, each as defined in claim 10, arranged in adjacent face-to-face relationship with at least one of the gas flow margins of the outer trough screen of one filter element in close nesting relationship with the corresponding margin of the adjacent outer trough screen face of the other filter element.

12. A filter element for a high-velocity impingement gas filter comprising: a trough screen as defined in claim 9; another screen arranged over the inner face of the trough screen and in contact with the longitudinal trough edges thereof along their respective lengths so that its open mesh wall cooperates with the open mesh walls of the trough screen to form an alternate series of funnel-shaped gas flow pockets, which are open at their upstream ends and closed with mesh at their downstream ends, and an intermediate series of funnel-shaped pockets which are closed at their upstream ends and open at their downstream ends.

13. The filter element of claim 12 wherein: said other screen is another trough screen having its longitudinal trough edges in contact with the corresponding longitudinal trough edges of the opposed screen throughout their lengths.

14. The filter element of claim 12 wherein: said other screen is a flat screen.

15. The filter element of claim 12 wherein: said other screen is a flat screen; and another trough screen is arranged with its inner face in contact with the other face of the flat screen so as to form in cooperation therewith another similar series of alternate pockets and of intermediate pockets.

16. The filter element of claim 15 wherein: the pointed ends of one set of troughs are located along one gas flow margin and of another set of troughs at the opposite gas flow margin.

17. A high-velocity impingement gas filter comprising: at least two filter elements, each as defined in claim 12, arranged in adjacent face-to-face relationship with at least one of the gas flow margins of the outer trough screen face of one filter element in close nesting relationship with the corresponding margin of the adjacent outer trough screen face of the other filter element.

18. A high-velocity impingement gas filter comprising: at least two filter elements, each as defined in claim 12, arranged in adjacent face-to-face relationship with the alternate trough bights, on the outer trough screen face of each element, in contact with the corresponding intermediate trough bights on the adjacent outer trough screen face of the other filter element.

19. A high-velocity impingement gas filter comprising: at least two filter elements, each as defined in claim 15, arranged in adjacent face-to-face relationship with at least one of the gas flow margins of one filter element in close nesting relationship with the corresponding margins of the adjacent face of the other filter element.

20. A high-velocity impingement gas filter comprising: at least two filter elements, each as defined in claim 15, arranged in adjacent face-to-face relationship with the alternate trough bights, on the outer trough screen face of each element, in contact with the corresponding intermediate trough bights on the adjacent outer trough screen face of the other filter element.

21. The trough screen of claim 1 wherein the longitudinal edges of troughs which converge in one direction meet each other at the ends of their respective troughs.

22. In a high-velocity impingement gas filter: a pair of trough screens, each as defined in claim 1, arranged with their outer faces in adjacent face-to-face relationship and with at least one of the gas flow margins of the outer face of one trough screen in close nesting relationship with the corresponding margin of the adjacent outer face of the other trough screen.

23. In a high-velocity impingement gas filter: a pair of trough screens, each as defined in claim 1, arranged with their outer faces in adjacent face-to-face relationship and with the alternate trough bights, on the outer face of each trough screen, in contact with the corresponding intermediate trough bights on the outer face of the other trough screen.

24. A trough screen of the class described comprising: an open mesh screen, having inner and outer faces and adjacent inner-face depressions forming a pair of adjacent and generally parallel troughs on its inner face and a corresponding pair of adjacent and generally parallel protuberances on its outer face; one of said troughs increasing in cross sectional area and depth from one of its ends toward the other and the other trough increasing in cross sectional area and depth in the reverse direction.

25. The trough screen of claim 24 wherein: said troughs are of general V-shape in cross section; said one trough is repeated transversely across the screen to form a series of alternate troughs; and said other trough is repeated transversely across the screen to form a series of intermediate troughs.

26. A gas flow element of the class described comprising: a first trough screen as defined in claim 25; and another screen arranged with one of its faces in contact with the inner face of said first trough screen; said screens cooperating with each other to form a system of gas flow spaces defined by mesh walls.

27. A gas flow device of the class described comprising: at least two elements, each as defined in claim 26, arranged in adjacent face to face relationship with their adjacent outer trough screen faces in close internesting relationship along a transverse line corresponding to the large ends of the alternate troughs.

ROBERT F. LOGSDON.

References Cited in the file of this patent

UNITED STATES PATENTS

| Number | Name | Date |
|---|---|---|
| 2,286,479 | Farr | June 16, 1942 |
| 2,410,371 | Vokes | Oct. 29, 1946 |
| 2,486,728 | Asad | Nov. 1, 1949 |